US008711413B2

(12) United States Patent
Burke, Jr.

(10) Patent No.: US 8,711,413 B2
(45) Date of Patent: Apr. 29, 2014

(54) METHODS AND SYSTEMS FOR MANAGING PRINT DEVICE SUPPLIES USING CLOUD ADMINISTRATION SYSTEM CONFIGURED FOR CHEMICAL SIGNATURE TRACKING

(75) Inventor: Robert William Burke, Jr., Stanley, NY (US)

(73) Assignee: Xerox Corporation, Norwalk, CT (US)

( * ) Notice: Subject to any disclaimer, the term of this patent is extended or adjusted under 35 U.S.C. 154(b) by 271 days.

(21) Appl. No.: 13/398,570

(22) Filed: Feb. 16, 2012

(65) Prior Publication Data

US 2013/0215452 A1 Aug. 22, 2013

(51) Int. Cl.
*G06F 3/12* (2006.01)

(52) U.S. Cl.
USPC .......................................................... 358/1.15

(58) Field of Classification Search
USPC .......................................................... 358/1.15
See application file for complete search history.

(56) References Cited

PUBLICATIONS

Methods and Systems for Managing Print Device Licenses Using a Cloud Administration System; U.S. Appl. No. 13/112,245, filed May 20, 2011.
Method and System for Managing Print Jobs Using a Cloud Administration System; U.S. Appl. No. 13/112,303, filed May 20, 2011.
Method and System for Managing Print Device Information Using a Cloud Administration System; U.S. Appl. No. 13/112,396, filed May 20, 2011.
Methods and Systems for Providing Software Updates Using a Cloud Administration System; U.S. Appl. No. 13/112,455, filed May 20, 2011.
Methods and Systems for Tracking and Managing Print Device Inventory Information Using a Cloud Administration System; U.S. Appl. No. 13/112,552, filed May 20, 2011.
Method and System for Managing Print Device Information Using a Cloud Administration System, filed May 20, 2011.
Systems and Methods for Managing Customer Replaceable Monitor (CRUM) Paired Identifiers Using a Cloud Administration System; U.S. Appl. No. 13/357,368, filed Jan. 24, 2012.

*Primary Examiner* — Douglas Tran
*Assistant Examiner* — Justin Katzwhite
(74) *Attorney, Agent, or Firm* — Ronald E. Prass, Jr.; Prass LLP

(57) ABSTRACT

A cloud administration system for chemical signature-based print device consumable monitoring includes a storage module for storing reference chemical signature data, and a monitoring system having one or more sensors configured for detecting a chemical signature of a consumable such as ink or toner. The detected chemical signature data may be compared with reference stored chemical signature data to determine whether monitored consumables have a chemical signature that matches a known chemical signature.

20 Claims, 6 Drawing Sheets

METHODS AND SYSTEMS FOR MANAGING PRINT DEVICE SUPPLIES USING CLOUD ADMINISTRATION SYSTEM CONFIGURED FOR CHEMICAL SIGNATURE TRACKING

RELATED APPLICATIONS

This application is related to the U.S. patent application Ser. No. 13/112,625 entitled "Methods and Systems for Managing Print Device Licenses Using a Cloud Administration System," U.S. patent application Ser. No. 13/112,245 entitled "Method and System for Managing Print Jobs Using a Cloud Administration System," U.S. patent application Ser. No. 13/112,303 entitled "Method and System for Managing Print Device Information Using a Cloud Administration System," U.S. patent application Ser. No. 13/112,396 entitled "Methods and Systems for Providing Software Updates Using a Cloud Administration System," U.S. patent application Ser. No. 13/112,455 entitled "Methods and Systems for Tracking and Managing Print Device Inventory Information Using a Cloud Administration System," and U.S. patent application Ser. No. 13/112,552 entitled "Method and System for Managing Print Device Information Using a Cloud Administration System," each filed on May 20, 2011, the entire disclosures of each application being incorporated by reference herein in their entirety. This application is related to the U.S. patent application Ser. No. 13/357,368 entitled "Systems and Methods for Managing Customer Replaceable Monitor (CRUM) Paired Identifiers Using a Cloud Administration System", filed Jan. 24, 2012, the entire disclosure of which is incorporated herein by reference in its entirety.

FIELD OF DISCLOSURE

The disclosure relates to methods and systems for managing print device information using a cloud administration system. In particular, the disclosure relates to printer supply management using a cloud administration system configured for chemical signature tracking.

BACKGROUND

Typical ant-counterfeiting measures pertaining to print device systems are reactive. For example, product keying is a reactive anti-counterfeiting method that includes forming a print device or component thereof so that a consumable for use with the print device or component must be particularly shaped to be operable. Such reactive anti-counterfeiting measures are often thwarted by counterfeiters by, for example, merely emulating product packaging.

SUMMARY

System and methods for monitoring print device consumables are disclosed. Systems may use cloud-based chemical signature data, product-based chemical sensor(s), and supply-based chemical markers for monitoring print device consumables and usage.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an exemplary embodiment, systems may include a cloud administration system for managing chemical signatures for a remote print device, the system having a processing module in communication with a plurality of print devices, wherein the processing module is located remotely from each of the plurality of print devices, the cloud administration system having a chemical signature storage module in communication with the processing module, wherein the processing module is configured to: receive chemical signature data associated with a print device consumable, store the chemical signature data in the storage module, and transmit the chemical signature data to the print device, wherein the cloud administration system operates as a shared resource for each of the plurality of print devices, wherein the chemical signature data comprises at least one of one or more reference chemical signatures and one or more detected chemical signatures; and a print device consumable monitoring system.

In an embodiment, systems may include the print device consumable monitoring system having one or more sensors arranged in at least one of the plurality of print devices. Systems may include the sensor(s) being configured to detect a chemical characteristic of a print device consumable. Systems may include the sensor(s) being a spectrophotometer. Systems may include the sensor(s) being configured to detect a chemical element, compound, protein, and/or nanostructure. In an embodiment, systems may include the sensor being configured to detect an amount of chemical constituent in a sample of print device consumable.

In an embodiment, systems may include the print device consumable being ink or toner. In systems, the constituent may be a chemical additive. In an embodiment, the constituent may be a carbon nanostructure.

In an embodiment, systems may include the amount of detected chemical constituent being electronically communicated to a controller of the print device. In an embodiment, systems may include the print device having a chemical signature storage queue for storing chemical signature data. In an embodiment, systems may include the print device having a media sheet processing path, the sensor being located adjacent to the media sheet processing path for monitoring print device consumables. In an embodiment, the sensor may be configured to communicate the amount of detected chemical constituent to the controller as detected chemical signature data.

In an embodiment, methods for determining a chemical signature for a print device consumable may include detecting an amount of chemical constituent in a print device consumable; communicating the detected amount of chemical constituent as a data value to a print device controller; and determining a chemical signature based on at least the detected data value. In an embodiment, methods may include repeating the detecting and the communicating for a plurality of print device consumables, and determining the chemical signature based on the detected data values for the plurality of print devices. In an embodiment, methods may include the print device consumable being ink or toner.

In an embodiment, methods for managing chemical signatures for print consumable monitoring may include storing chemical signature data, the chemical signature data comprising a chemical signature as a data object, the chemical signature data being stored in at least one of a chemical signature queue of at least one print device, and a chemical signature storage module of a cloud administration system; and causing at least one of at least one print device and a cloud administration system to communicate chemical signature data for receipt by at least one of the print device and the cloud administration system. In an embodiment, methods may include modifying a chemical signature data object stored in at least one of the chemical signature queue and the chemical signature storage module.

In an embodiment, methods for monitoring print device consumables may include detecting an amount of chemical constituent in a print device consumable; and causing a sensor to generate one or more data values corresponding to the detected amount of the chemical constituent. In an embodiment, methods may include comparing the one or more data values with stored chemical signature data; and modifying the stored chemical signature data based on the comparing.

Exemplary embodiments are described herein. It is envisioned, however, that any system that incorporates features of apparatus and systems described herein are encompassed by the scope and spirit of the exemplary embodiments.

DETAILED DESCRIPTION

Figure 1A:
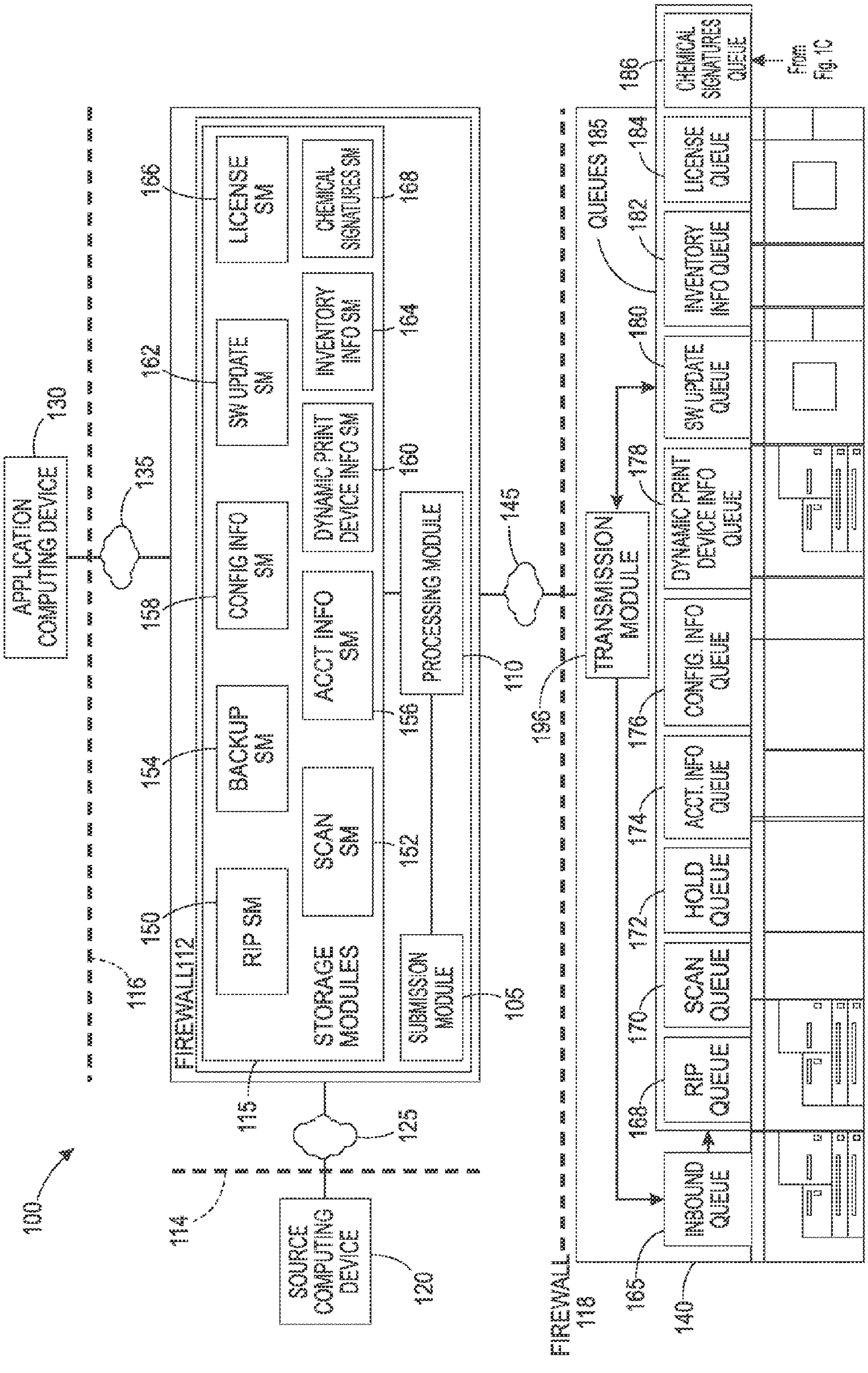
FIG. 1A shows a cloud administration system in accordance with an exemplary embodiment.

Exemplary embodiments are intended to cover all alternatives, modifications, and equivalents as may be included within the spirit and scope of the apparatus and systems as described herein.

Reference is made to the drawings to accommodate understanding of systems and methods for print device consumable monitoring using chemical signature detection and a cloud administration system. In the drawings, like reference numerals are used throughout to designate similar or identical elements. The drawings depict various embodiments and data related to embodiments of illustrative systems and methods for monitoring print device consumables using chemical signatures and a cloud administration system.

The following terms shall have, for the purposes of this application, the respective meanings set forth below.

An "application computing device" is a computing device capable of sending information to or receiving information from a cloud administration system.

A "chemical signature" refers to an identifying chemical characteristic.

A "cloud administration system" refers to one or more physical and/or logical devices that operate as a shared resource for multiple remote print devices and/or computing devices. Logical devices in a cloud administration system may be accessed without any knowledge of the corresponding physical devices.

A "computing device" or a "processor" refers to a computer or other machine that performs one or more operations according to one or more programming instructions. Exemplary computing devices may include personal computers, servers, mobile communication devices and/or the like. An exemplary computing device or processor.

A "firewall" is hardware and/or software used to protect a resource of a network from unauthorized external access.

A "job" refers to a logical unit of work that is to be completed for a customer.

A "license management service" is an entity that manages and/or tracks compliance of a user with a print device license.

A "logical device" is a representation of a physical device that uniquely identifies the corresponding physical device. For example, a network interface may be assigned a unique media access control address that is the logical unique identifier of a physical device. As such, a conventional device is a combined logical and physical device in which the logical device provides the entire identity of the physical device.

A "module" is a component of a larger system, such as a cloud administration system.

An "operation" or "print-related function" is a function that is performed on a print job during production. Exemplary operations may include raster image processing, formatting, stapling, collating, sorting, punching, binding and/or the like.

A "physical device" is a physical resource such as a computing device, a computer-readable storage medium and/or the like.

A "print job" refers to a job that can be processed by a print device. For example, a print job may include a job that is to be printed, scanned or otherwise processed by a print device.

A "print device" refers to a device capable of performing one or more print-related functions. For example, a printing device may include a printer, a scanner, a copy machine, a multifunction device, a collator, a binder, a cutter or other similar equipment. A "multifunction device" is a device that is capable of performing two or more distinct print-related functions. For example, a multifunction device may have print and scan capabilities.

A "print device license" is a file that describes the usage rights associated with a print device.

A "queue" is a data structure stored on a computer-readable medium and configured to temporarily store information, including, but not limited to a print job, a print device license and/or the like.

The term "remote," as used herein with respect to computing devices and/or printing devices, refers to devices that operate on different computer networks and/or computer networks operated by different entities. For example, a computing device is remote from a printing device if the computing device is connected to a first LAN operated by a first entity and the printing device is connected to a second LAN operated by a second entity.

A "resource" is a physical device comprising a processor and/or a storage medium. Exemplary resources may include a computing device, a processing device, a storage device and/or the like.

A "shared resource" is a resource that may be accessed and used by a plurality of other resources.

A "source computing device" is a computing device that is capable of transmitting one or more print jobs to a cloud administration system.

A "storage module" or "SM" is a computer-readable storage medium or portion thereof.

FIG. 1A shows an exemplary cloud administration system in accordance with an embodiment. FIG. 1A shows a cloud administration system 100 may include a submission module 105, a processing module 110 and one or more storage modules 115. The submission module 105 and/or one or more of the storage modules 115 may be in communication with the processing module 110. In an embodiment, all communication to or from the cloud administration system 100 may be through a firewall 112.

In an embodiment, a storage module 115 may correspond to an operation or type of operation to be performed on a print job, or it may correspond to the type of information it stores. For example, as illustrated by FIG. 1A, the storage modules 115 may include a raster image processing (RIP) storage module 150, a scan storage module 152, a backup storage module 154, an accounting information storage module 156, a configuration information storage module 158, a dynamic print device information storage module 160, a software update storage module 162, an inventory information storage module 164, a license storage module 166 and a chemical signature module 168 and/or the like. Storage modules 115 are discussed in more detail below. In an embodiment, a cloud administration system 100 may be in communication with one or more source computing devices 120. A source computing device 120 may be located remotely from the cloud administration system 100. In an embodiment, all source computing devices 120 may be located remotely from the cloud administration system 100. In an embodiment, a source computing device 120 may communicate with a cloud administration system 100 through a plurality of firewalls. For example, a communication from a source computing device 120 to a submission module 105 may pass through a firewall 114 associated with the source computing device and the firewall 112 associated with the cloud administration system 100.

In an embodiment, a source computing device 120 may communicate directly with a cloud administration system 100 over a network 125. In an embodiment, the network 125 may be operated by an entity. An entity may be a corporation, an organization, a group, an individual and/or the like. In an embodiment, a plurality of source computing devices 120 may communicate with the cloud administration system 100 over one or more networks.

In an embodiment, a cloud administration system 100 may be in communication with one or more application computing devices 130. An application computing device 130 may be in communication with the processing module 110 and/or one or more storage modules 115. In an embodiment, an application computing device 130 may communicate with the cloud administration system 100 through a plurality of firewalls. For example, a communication from an application computing device 130 to a processing module 110 may pass through a firewall 116 associated with the application computing device and the firewall 112 associated with the cloud administration system 100.

In an embodiment, an application computing device 130 may be located remotely from the cloud administration system 100. In an embodiment, each application computing device 130 may be located remotely from the cloud administration system 100. In an alternate embodiment, an application computing device 130 may be a component of the cloud administration system 100.

An application computing device 130 may communicate with the cloud administration system 100 over a network 135. In an embodiment, an application computing device 130 may communicate directly with a submission module 105 over a network 135. In an embodiment, an application computing device 130 may communicate with a submission module 105 through one or more firewalls.

An application computing device 130 may be located remotely from a source computing device 120. In an embodiment, each application computing device 130 may be located remotely from each source computing device 120. In an embodiment, the network 135 over which an application computing device 130 may communicate with a cloud administration system 100 may be operated by a different entity than that which operates a network over which a source computing device 120 may communicate with the cloud administration system.

In an embodiment, a cloud administration system 100 may be in communication with one or more print devices 140. A print device 140 may be located remotely from the cloud administration system 100 and may communicate with the cloud administration system over one or more networks 145. In an embodiment, each print device 140 may be located remotely from the cloud administration system 100.

In an embodiment, a print device 140 may communicate with a cloud administration system 100 through a plurality of firewalls. For example, a communication from a print device 140 to a cloud administration system 100 may pass through a firewall 118 associated with the print device and the firewall 112 associated with the cloud administration system 100.

In an embodiment, a print device 140 may be located remotely from a source computing device 120 and an application computing device 130. In an embodiment, each print device 140 may be located remotely from each source computing device 120 and each application computing device 130. In an embodiment, the network 145 over which a print device 140 may communicate with a cloud administration system 100 may be operated by an entity that is different that that which operates a network over which a source computing device 120 may communicate with the cloud administration system and/or a network over which an application computing device 130 may communicate with the cloud administration system.

In an embodiment, a print device 140 may have one or more queues 185 that may be inbound and/or outbound queues. Although inbound and outbound queues are discussed as being separate queues, it is understood that an inbound queue may perform inbound and outbound queue functions, and that an outbound queue may perform outbound and inbound functions.

In an embodiment, a print device 140 may have an inbound queue 165, such as a spooler and/or the like. An inbound spooler may be a queue that receives, stores, schedules and/or requests printing of a print job. In an embodiment, a print device 140 may have one or more outbound queues 185. An outbound queue may store print jobs and/or print device information until the print device transmits these print jobs and/or print device information. For example, as illustrated by FIG. 1A, a print device may have a RIP queue 168, a scan queue 170, a hold queue 172, an accounting information queue 174, a configuration information queue 176, a dynamic print device information queue 178, a software update queue 180, an inventory information queue 182, a license queue 184, a chemical signature queue 186 and/or the like. Queues 185 are discussed in more detail below.

In an embodiment, a print device 140 may have a transmission module 196. A transmission module may be in communication with one or more queues 185. A transmission module 196 may be configured to transmit data from a print device 140 to a computing device, another print device and/or the like. In an embodiment, a transmission module 196 may be in communication with a cloud administration system 100. For example, a transmission module 196 may be in communication with a processing module 110 of a cloud administration system 100.

In an embodiment, a source computing device 120, an application computing device 130 and a print device 140 may not communicate directly with one another. As illustrated by FIG. 1A, the source computing device 120, the application computing device 130 and the print device 140 may communicate indirectly via a cloud administration system 100.

Figure 1B:
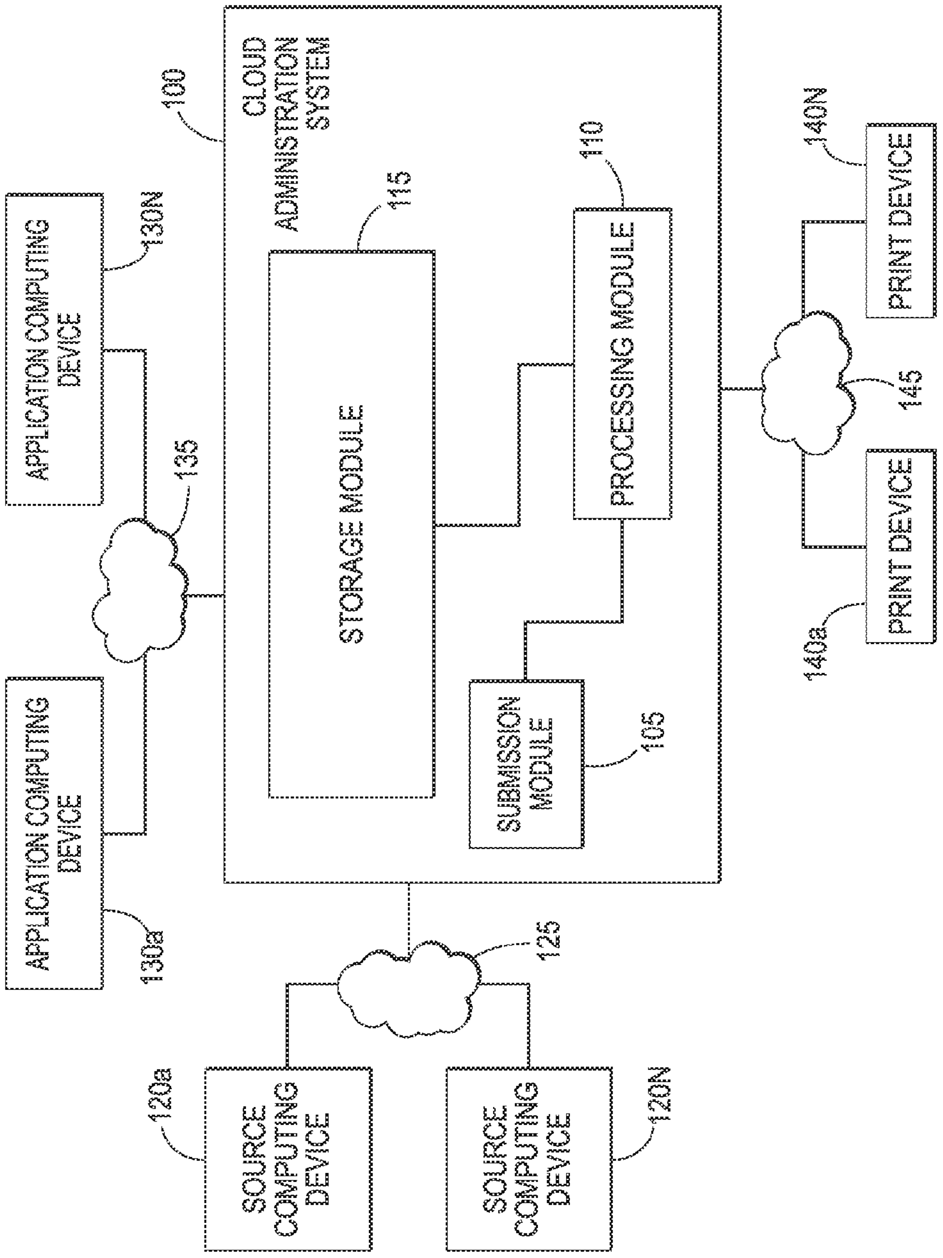
FIG. 1B shows a cloud administration system in accordance with an exemplary embodiment.

FIG. 1B depicts an exemplary cloud administration system 100 according to an embodiment. As illustrated by FIG. 1B, a cloud administration system 100 may include a submission module 105, a processing module 110, and a storage module 115. The cloud administration system 100 may communicate with more than one source computing device 120*a*-N, application computing device 130*a*-N and/or print device 140*a*-N.

In an embodiment, a chemical signature may be associated with a consumable that is usable with a print device. The consumable may be ink or toner. The ink or toner may be monitored from within an cartridge, for example. Alternatively, a sensor may be configured to monitor ink or toner that has been deposited on a substrate in a print device, such as paper or other recording media. The chemical signature is an identifying chemical characteristic. For example, the chemical signature may be a unique identifier associated with the ink or toner and/or ink or toner cartridge, and useful for distinguishing the ink or toner contained in the ink or toner cartridge from other similar ink or toners not contained in the ink or toner cartridge, for example.

In an embodiment a chemical signature may be associated with ink or toner and other such consumables and/or supplies for systems such as printing systems.

A chemical signature may be a chemically unique attribute of a monitored sample or a known consumable. For example, marking material such as ink or toner may be chemically reactive to stimuli such as light. In an embodiment, a chemical signature may comprise a unique spectral signature that corresponds to a particular ink or toner formulation. The unique spectral signature may be detected using a photospectrometer.

Chemical signatures such as photospectral signatures are advantageous for their accommodation of overt anti-counterfeiting technology that requires a specialized sensor and knowledge that the feature is included in the protected supply. For example, a particular ink or toner formulation manufactured by a particular entity, or associated with a particular device license, for example, may be assigned a value or range of values that correspond to acceptable spectral signature(s) associated with the particular ink or toner. Accordingly, a print device that is configured to use the particular ink or toner may include a sensor system such as a photospectrometer for detecting in-line photospectral information and/or signature (s) of ink or toner used in the print device.

Consumables such as ink or toner may include a chemical signature such as taggants. Taggants are typically microscopic markers that may be detected with various decoders. For example, ink or toner may include chemicals that are known to impart specific reflective, refractive, and/or electromagnetic properties to the ink or toner. By way of example, a wine producer may blend DNA from a particular grape vine into an ink or toner used for printing the wine-producer's wine label. The wine-producer's wine label may thus be distinguished from counterfeit wine labels that may be printed with ink or toners that likely do not include DNA from the particular grape vine. Sensors may be configured for detecting specific reflection, refraction, and/or electromagnetic properties of the ink or toner imparted by taggants such as DNA included in the print on the wine label.

Other chemical signature detection systems or consumable monitoring systems may include systems based on technology including organic semi-conductor arrays including organic transistors; nanotechnology sensors configured for detecting low concentrations of gas or vapor, the sensors having detecting elements such as carbon nanotubes, zinc oxide nanowires, and/or palladium nanoparticles, for example. Such elements may be changeable based on electrical characteristics, such as resistance or capacitance, when they absorb gas. Such sensor may be inexpensive to produce and implement.

Other chemical signature detection systems or consumable monitoring systems may include sensors having gold nanoparticles arranged on a polymer film for detecting unique and volatile organic compounds contained in, for example, ink or toner for a print device. The polymer swells upon detecting said compounds, changing a spacing between the gold nanoparticles and thus a resistance of the gold layer. Other chemical signature detection systems may include nanocantilevers that oscillate at their resonant frequency until a particular chemical attaches to the cantilever thereby changing or stopping the oscillation. A detection signal may be triggered by the change in oscillation. Nanocantilevers may be configured to attract organic molecules, for example. Other chemical signature detection systems may include MEMS based sensor systems, for example.

Chemical signature detection systems or consumable monitoring systems may include systems including carbon nanotubes such as enzyme coated carbon nanotubes (ECNT). Sensors including ECNT are useful as biosensors in medical and environmental analysis. Carbon nanotubes exhibit a three-dimensional structural network that provides stability, promotes enhances enzyme loading, and provides increased analyte exposure. Such systems are particularly useful for analyzing liquid samples, but may also be configured for gas analysis.

In an embodiment, a print device may be a printer that applies marking material, for example, ink or toner to media. In an embodiment, a print device consumable such as ink or toner may be contained within, for example, an ink or toner cartridge. The ink or toner may include a chemical signature. In an embodiment, the consumable may be configured for use with a print device such as a printer. The printer device may include a consumable monitoring system having a chemical signature sensor. The chemical signature sensor may be any sensor operably configured for detecting a particular chemical attribute of a sample. For example, the sensor may be a photospectrometer configured for detecting a reactivity of a particular ink or toner sample to light. The sensor may be positioned, for example, in-line with a media processing path in a print device. The sensor may be configured to detect a chemical signature of ink or toner that has been deposited on a substrate such as paper. Alternatively a suitable sensor system may be implemented for detecting a chemical signature of an ink or toner contained within, for example, an ink or toner or toner cartridge.

Figure 1C:
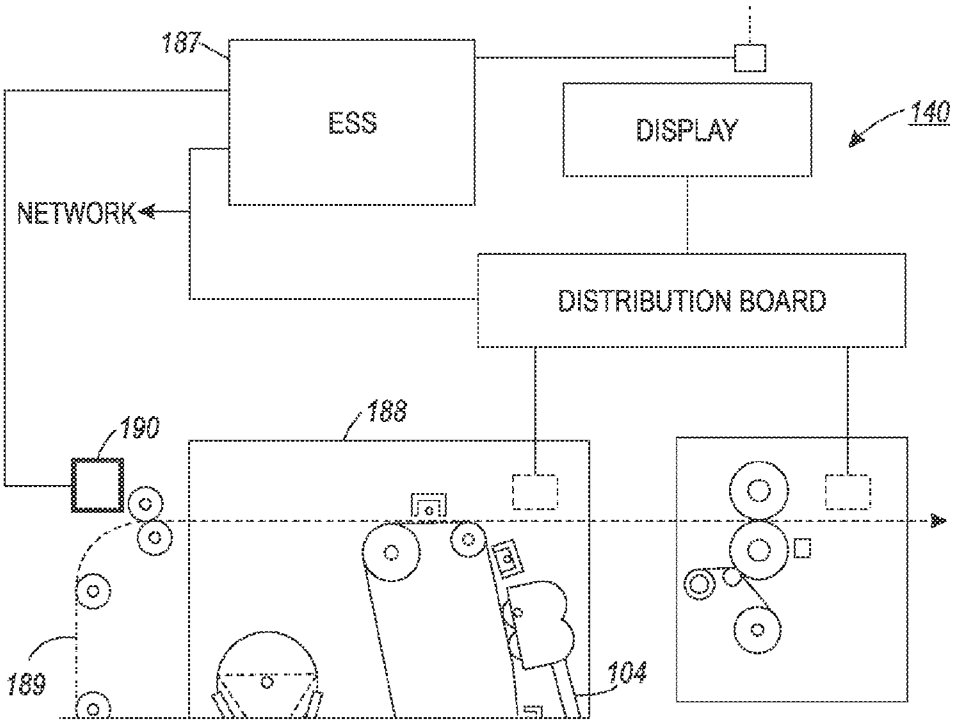
FIG. 1C shows a print device connected to the cloud administration system including a consumable monitoring system in accordance with an exemplary embodiment.

The unique chemical signature of a consumable such as ink or toner may be a chemical signature known, selected, and/or applied by a manufacturer or supplier of the ink or toner, or may be a chemically signature previously not determined. One or more chemical signatures may stored in a chemical signature queue 186 of a print device. FIG. 1C shows an exemplary print device including a consumable monitoring system having a sensor for detecting a chemical sensor in a consumable such as printer ink or toner. In particular, FIG. 1C shows a print device 140. The print device 140 includes a controller 187. The controller 187 may be connected to a network. For example, the controller may be connected to a LAN, and/or a WAN connected to the cloud administration system 100. The controller 187 may be connected to the transmission module 196, and the queues 185, for example, as shown in FIGS. 1A and 1C.

The controller may be operably connected to a print engine 188. The print engine 188 of the print device 140 may be configured for depositing marking material such as ink or toner from a marking device 104 onto media at a media processing path 189 that passes through the print engine 188. A chemical signature sensor(s) 190 may be arranged at an operable position near the processing path 189. Systems may include a single chemical sensor 190, or a plurality of chemical sensors. The plurality of sensors may be one or more arrays of sensors, or sensors arranged at various positions within the print device 140 as appropriate for monitoring consumables. The chemical sensor 190 may be configured to detect chemical characteristics of consumable such as ink or toner deposited on media that is processed by the print engine 188. For example, the chemical sensor 190 may comprise a spectrophotometer, and/or an ECNT sensor. The detected characteristics may be analyzed, stored, and communicated as data pertaining to a chemical signature. Chemical signature data may include data and/or metadata relating to value(s) and/or ranges of values that relate to a particular chemical signature, such as detected amount of chemical constituent.

For example, one or more chemical sensor(s) 190 may be configured to detect an amount of a particular chemical additive. A chemical signature corresponding to the additive may comprise a range of values of sensor readings that represent the range of acceptable concentrations in which the additive may be found in analyte comprising the additive compound to constitute a known unique chemical signature.

The controller 187 may be configured to receive chemical signature readings from the sensor 190. The controller may be configured to compare data based on the received chemical sensor 190 readings with stored chemical signature data that is reference data. The chemical signature reference data may comprise one or more chemical signatures of a supplier. Accordingly, the controller 187 may determine whether the consumable contains an amount of additive that constitutes a unique chemical signature. The unique chemical signature may be a signature of an authorized consumable supplier. Alternatively, the unique chemical signature may be the signature of an unauthorized supplier, previously unknown to system users and determined by the controller 187. Or the unique chemical signature may be a known chemical signature received by the controller 187 from, for example, the cloud administration system 100.

In an embodiment, chemical signature information may be stored and transmitted electronically as chemical signature data. Chemical signature data and metadata may be stored in a chemical signature storage module 168 as shown in FIG. 1A. The chemical signature data may include determined chemical signatures associated with consumables as detected in a print device 140. The chemical signature data may include chemical signatures associated with permitted or authorized consumables communicated by way of data received and/or stored at the cloud administration system 100. Chemical signature data may be communicated between and stored on chemical signature storage module 168 of a cloud administration system 100, and/or one or more source computing device(s) 120, and/or an application computing device 130, and/or one or more print device(s) 140, such as a print device as shown in FIG. 1A having a chemical signature queue 186.

Cloud administration methods and systems using chemical signature data may enable control and monitoring of consumable usage pertaining to print devices. For example, a particular chemical signature or plurality of signatures may be associated with an authorized consumable such as ink or toner of a particular type and/or from a particular supplier. A chemical signature may comprise, for example, a value or range of values corresponding to amounts or concentrations of a chemical element, compound, component, or constituent. A transmission module 196 of a print device 140 may communicate with a processing module 110 a cloud administration system 100 to receive chemical signature data for storage in a chemical signature queue 186 of the print device 140.

The print device controller 187 may communicate with one or more chemical sensor(s) 190 to receive sensor readings. The controller 187 may receive, communicate, translate, analyze, compare, and/or otherwise process readings from the chemical sensor 190. For example, the controller 187 may receive chemical sensor readings and store and/or process chemical signature data based on the readings from the chemical signature sensor 190. The controller 187 may cause a comparison of the chemical signature data based on the sensor readings with chemical signature data that is stored in a chemical signature queue 186.

If the sensed chemical signature matches the stored chemical signature or reference signature, the chemical signature queue 186 may be updated to include data indicating that a processed or monitored consumable includes a chemical signature that matches a stored chemical signature. The transmission module 196 may communicate with the processing module 110 to update the chemical signature module 168 of the cloud administration system 100 to indicate that consumable is authorized. For example, where a consumable is found to be authorized by including a chemical signature that matches a reference chemical signature, a product user interface of the print device 140 may be updated to communicate approval and/or thanks to a user of the print device 140.

If the detected chemical signature does not match a reference chemical signature, the controller 187 may cause the chemical signature queue 186 to be updated to indicate that a chemical signature does not match a reference or stored chemical signature. The controller 187 may cause the detected, unmatched chemical signature to be stored in the chemical signature queue 186. The print device 140 may communicate with the cloud administration system to update the chemical storage module 168 to include data pertaining to the unmatched chemical signature detected by the print device 140. Such data may include, for example, the detected chemical signature, and/or data indicating that the chemical signature detected at the print device 140 does not match a signature stored in a chemical signature queue 186 of the print device 140 and/or the chemical signature module 168 of the cloud administration system 100.

A non-match of sensed chemical signature data compared with reference chemical signature data may indicate that specific (e.g., types and/or brands), compatible and/or known, unauthorized and/or incompatible, and/or unknown consumables have or have not been implemented and/or detected in a print device 140. Based on a determination that sensed chemical signature data of a monitored consumable does not indicate a match to a stored or known chemical signature(s), a cloud administration system 100 may be informed that a print device 140 is using unknown consumable(s), and may cause a user interface message at a print device 140, for example, to indicate the same, and communicate remedial measures to a user, if applicable.

A match of chemical signature data to a reference chemical signature(s) known to be counterfeit may cause the system to update a chemical signature storage module and/or chemical signature queue. For example, in an embodiment, a transmission module may update a chemical signature module by way of a processing module, communicating to the cloud administration system that a counterfeit consumable has been detected, and/or enabling a system user to be informed that a counterfeit consumable has been detected. In an embodiment, a user interface may be caused to communicate to a print device user and/or system user that a counterfeit consumable has been detected. A user interface message may be caused to communicate to a print device user information based on the determination that a counterfeit consumable has been detected, such as steps for remediation. In an embodiment, a print device may be disabled or rendered at least partially inoperable when a counterfeit consumable has been detected.

Figure 2:
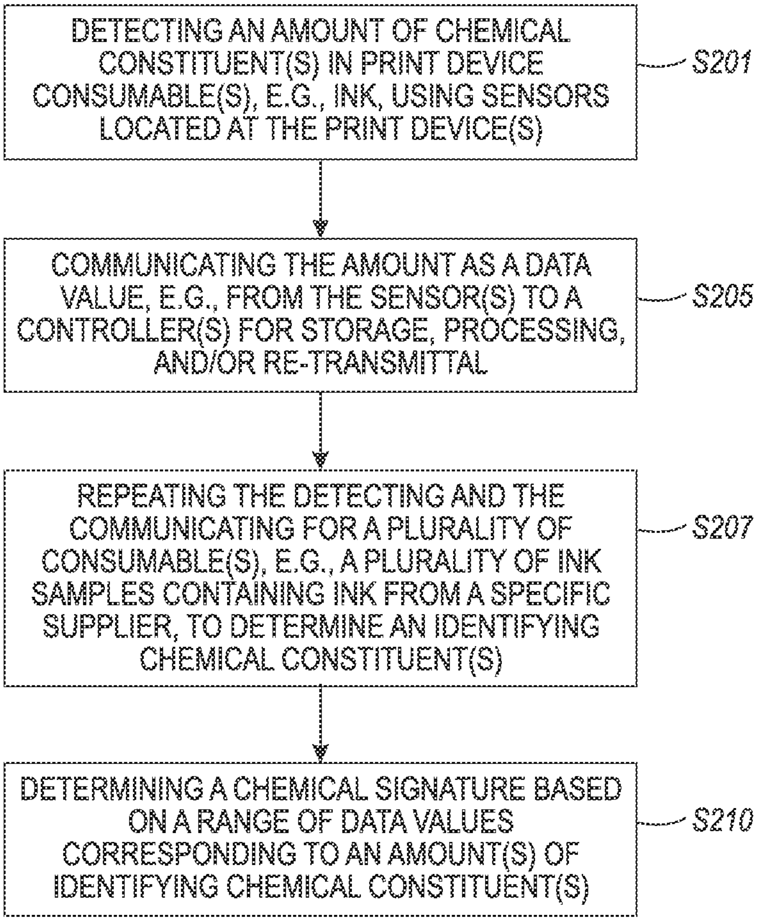
FIG. 2 shows methods for determining a chemical signature for a consumable in accordance with an exemplary embodiment.

Methods for determining and/or optimizing a chemical signature corresponding to a print device(s) consumable(s) may include signaturizing or determining a chemically unique or identifying characteristic of a particular print device consumable. For example, methods may include analyzing one or more printer ink or toner samples, and determining a chemically identifying aspect of the ink or toner. FIG. 2 shows an embodiment of consumable signaturizing methods. Methods may include detecting an amount of chemical constituent(s) in one or more print device consumables such as ink or toner at S201. For example, sensors that are configured for chemical detection may be arranged adjacent to a media, toner or ink distribution path or sheet processing path of a print device. The sensors may be configured to detect chemical components of ink or toner printed on paper sheet(s) traveling through the sheet processing path. The sensor may be configured, for example, to detect an amount of chemical element(s), compound(s), protein(s), and/or nano-structures and/or other chemical constituents of consumable(s).

Methods may include communicating a result of a detection performed by the one or more sensors. For example, methods may include communicating at S205 an amount of detected chemical constituent by way of a signal or a data value. The data value(s) may be communicated, or derived by signal conversion (analog to digital) from the sensor(s) to controller(s) for storage, processing, and/or re-transmittal for further communication.

Methods may include repeating at S207 the detecting and the communicating for a plurality of consumables. For example, detecting an amount of a chemical constituent(s) and communicating the detected amount to a controller for processing may be repeated for a plurality of consumables such as ink or toner cartridges and/or ink or toner samples containing a particular ink or toner type and/or ink or toner from a particular supplier. A plurality of sensor readings communicated to a controller(s) may be used to determine a chemically identifying characteristic(s) of the ink or toner. For example, methods may include determining at S207 that ink or toner from a particular supplier includes an amount of carbon nanotube structures. Methods may include determining that ink or toner containing an amount of carbon nanotube structures corresponds to ink or toner from a particular supplier. Methods may include determining at S207 a range of amounts of carbon nanotubes that correspond to ink or toner samples of the particular supplier.

Methods may include determining a chemical signature based on a data value or a range of data values. For example, methods may include determining at S210 a range of data values corresponding to an amount(s) of identifying chemical constituents. The data value or range of data values determined to correspond to an identifying chemical constituent may used to determine a chemical signature at S210. One or more data value/data value ranges corresponding to one or more identifying chemical constituents may form the basis of a chemical signature determined at S210.

Figure 3:
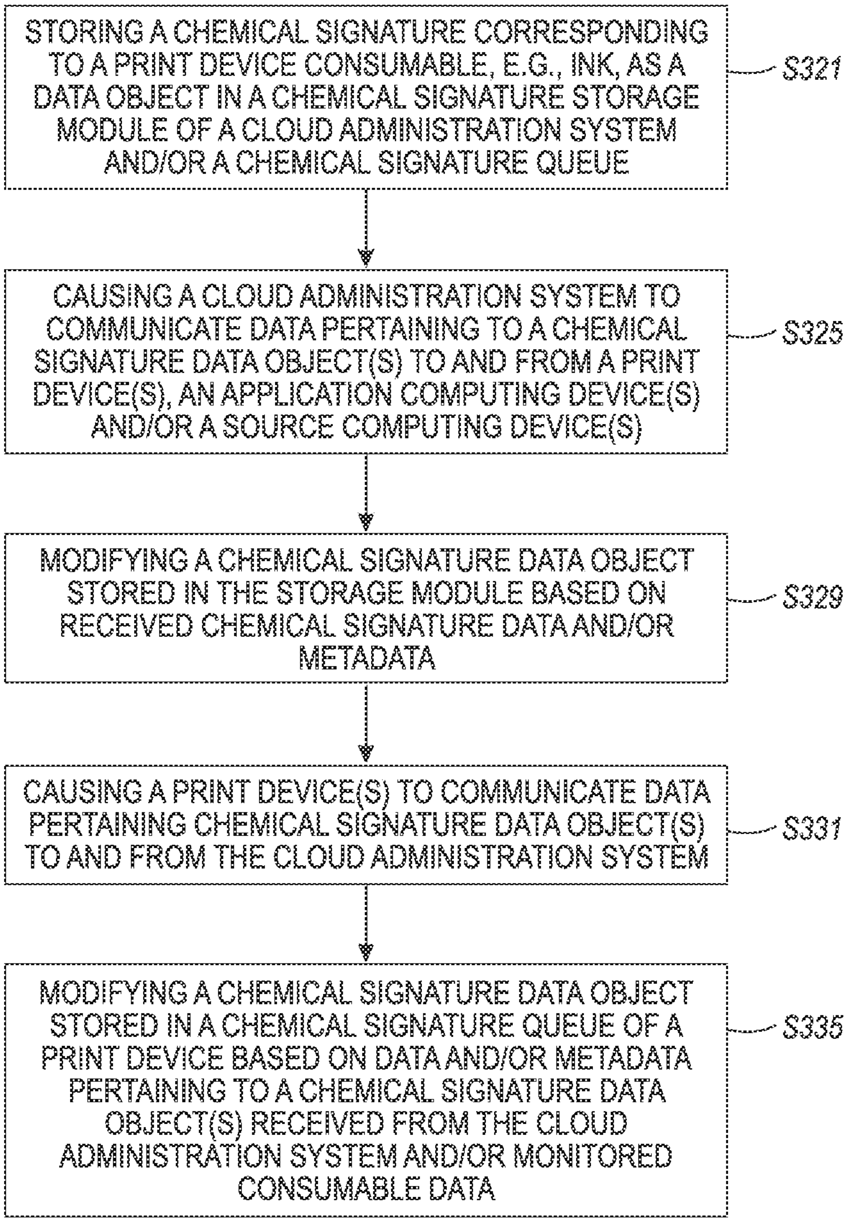
FIG. 3 shows methods for storing, communicating, and/or modifying chemical signature data in accordance with an exemplary embodiment.

Methods may include storing, communicating, and modifying a chemical signature(s) or data containing or pertaining to one or more chemical signatures. For example, FIG. 3 shows an embodiment of methods including storing a chemical signature as a data object at S321. The chemical signature may correspond to a print device consumable such as ink or toner. The chemical signature data object may be stored in a chemical signature storage module of a cloud administration system. The chemical signature data object may be stored in a chemical signature queue of one or more print device(s).

Methods may include causing at S325 a cloud administration system to communicate data pertaining to a chemical signature data object to and from print device(s), application computing device(s), and/or source computing device(s). For example, new chemical signature data acquired and determined by way of chemical sensors systems located at one or more print devices may form the basis for updating chemical signature data either or both the chemical signature queue(s) of the one or more print device(s) or the chemical signature storage module(s) of the cloud administration system. Alternatively, or in addition, new chemical signature data acquired by the cloud administration system by application computing device(s), source computing device(s), and other communicably connected devices may form the basis for updating chemical signature data at either or both the chemical signature queue(s) of the one or more print device(s) or the chemical storage module of the cloud administration system.

Data and/or metadata pertaining to one or more chemical signatures may be modified or updated. For example, methods may include modifying at S329 a chemical signature data object stored in the storage module based on chemical signature data received by the cloud administration system from at least one an application computing device(s), source computing device(s), and/or one or more print device(s). The chemical signature data may be modified to reflect newly acquired/determined chemical signature data, or to update pre-existing data pertaining to a chemical signature(s) corresponding to a particular consumable type and/or supplier.

Methods may include causing one or more print device(s) to communicate data pertaining to chemical signature data object(s) to and from a cloud administration system at S331. For example, the print device(s) may receive updated chemical signature data from the cloud administration system. The updated chemical signature data may be used to compare with monitored consumable data to determine matches in one or more chemical signature(s). Monitored consumable data may include data resulting from chemical sensor readings for monitored consumables. The print device(s) may send data to the cloud administration system including updated chemical signature data based on monitored consumables, such as data that differs from chemical signature data stored in the chemical signature queue, or indication that monitored consumable data does or does not match or correspond to stored chemical signature data for a particular consumable.

Methods may include at S335 modifying a chemical signature queue of a print device based on data and/or metadata pertaining to a chemical signature data object(s) received from a cloud administration system. Such data may include updated chemical signature data for comparing with monitored consumable data, or data based on chemical sensor readings. Such reference data may be communicated to the print device from the cloud administration system, and/or may be determined based on chemical sensor readings at a print device. For example, chemical sensor readings that do not match chemical signature data stored in a chemical signature queue may form the basis of new or updated chemical signature data. The updated data may form the basis of a determined chemical signature, a non-match between reference chemical signature data and data pertaining to a monitored consumable, and/or a match between reference chemical signature data and data pertaining to a monitored consumable.

Figure 4:
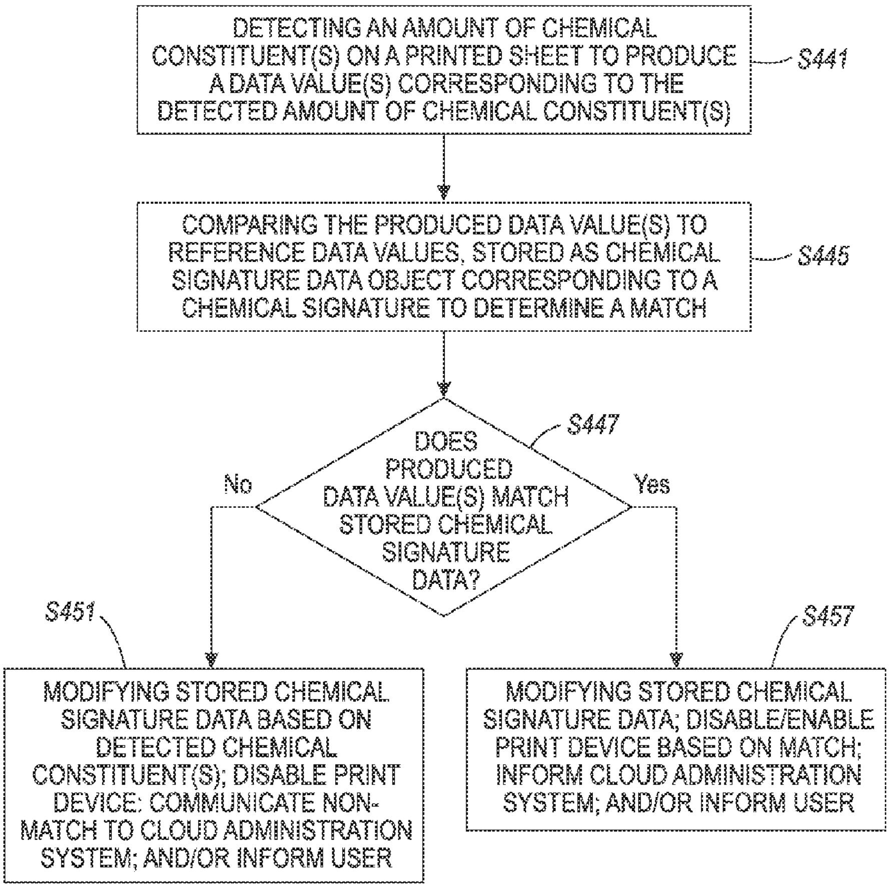
FIG. 4 shows methods for comparing and updating chemical signature data.

Methods may include monitoring print device consumable (s) and comparing monitored consumable data with reference chemical signature data. The reference chemical signature data, monitored data, and data pertaining to a match and/or non-match between reference data and monitored data may be stored in a chemical signature queue of a print device. FIG. 4 shows methods including detecting at S441 an amount of chemical constituent(s) on a printed sheet to produce a data value(s) corresponding to the detected amount of chemical constituent. The data value may reflect a mere presence of the chemical constituent, and/or an amount of the chemical constituent. Methods may include comparing at S445 the produced data value(s) based on monitored consumables with reference data values stored as a chemical signature data object corresponding to a chemical signature to determine a match or non-match at S447.

If the produced data value(s) indicate that the monitored consumable does not have a chemical signature matching a stored chemical signature, the chemical signature data may be modified at S451. For example, the chemical signature data may be modified based on the detected chemical constituents. The chemical signature may be updated to indicate a non-match, and cause a message to be displayed to a user of the print device, communication of the non-match to a cloud administration system, and/or disabling of the print device. If the produced data value(s) indicate that the produced data value(s) match stored chemical signature data at S447, the chemical signature data may be modified at S457. For example, the chemical signature queue may be modified to indicate the match, and may cause disabling or enabling of a print device based on the match; communication of the match to a cloud administration system, and/or communication to a user of the print device.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. A cloud administration system for managing chemical signatures for a remote print device, the system having a processing module in communication with a plurality of print devices, wherein the processing module is located remotely from each of the plurality of print devices, the cloud administration system comprising:
- a chemical signature storage module in communication with the processing module,
- wherein the processing module is configured to:
  - receive chemical signature data associated with a print device consumable,
  - store the chemical signature data in the storage module, and
  - transmit the chemical signature data to the print device,
- wherein the cloud administration system operates as a shared resource for each of the plurality of print devices,
- wherein the chemical signature data comprises at least one of one or more reference chemical signatures and one or more detected chemical signatures; and
- a print device consumable monitoring system.

2. The system of claim 1, the print device consumable monitoring system comprising:
- at least one sensor arranged in at least one of the plurality of print devices.

3. The system of claim 2, comprising the sensor being configured to detect a chemical characteristic of a print device consumable.

4. The system of claim 2, comprising the sensor being a spectrophotometer.

5. The system of claim 2, comprising the sensor being configured to detect a chemical element, compound, protein, and/or nanostructure.

6. The system of claim 2, comprising the sensor being configured to detect an amount of chemical constituent in a sample of print device consumable.

7. The system of claim 6, the print device consumable being ink or toner.

8. The system of claim 7, the constituent being a chemical additive.

9. The system of claim 7, the constituent being a carbon nanostructure.

10. The system of claim 7, the amount of detected chemical constituent being electronically communicated to a controller of the print device.

11. The system of claim 10, the print device comprising a chemical signature storage queue for storing chemical signature data.

12. The system of claim 10, the print device comprising a media sheet processing path, the sensor being located adjacent to the media sheet processing path for monitoring print device consumables.

13. The system of claim 12, the sensor being configured to communicate the amount of detected chemical constituent to the controller as detected chemical signature data.

14. A method for determining a chemical signature for a print device consumable, comprising:
- detecting an amount of chemical constituent in a print device consumable;
- communicating the detected amount of chemical constituent as a data value to a print device controller; and
- determining a chemical signature based on at least the detected data value.

15. The method of claim 14, comprising:
- repeating the detecting and the communicating for a plurality of print device consumables, and determining the chemical signature based on the detected data values for the plurality of print devices.

16. The method of claim 15, wherein the print device consumable is ink or toner.

17. A method for managing chemical signatures for print consumable monitoring, comprising:
- storing chemical signature data, the chemical signature data comprising a chemical signature as a data object, the chemical signature data being stored in at least one of a chemical signature queue of at least one print device, and a chemical signature storage module of a cloud administration system; and causing at least one of at least one print device and a cloud administration system to communicate chemical signature data for receipt by at least one of the print device and the cloud administration system.

18. The method of claim 17, comprising:

modifying a chemical signature data object stored in at least one of the chemical signature queue and the chemical signature storage module.

19. A method for monitoring print device consumables, comprising:

detecting an amount of chemical constituent in a print device consumable; and causing a sensor to generate one or more data values corresponding to the detected amount of the chemical constituent.

20. The method of claim 19, comprising:

comparing the one or more data values with stored chemical signature data; and modifying the stored chemical signature data based on the comparing.

* * * * *